No. 884,453. PATENTED APR. 14, 1908.
A. ARNESEN.
ANIMAL TRAP.
APPLICATION FILED APR. 25, 1907.
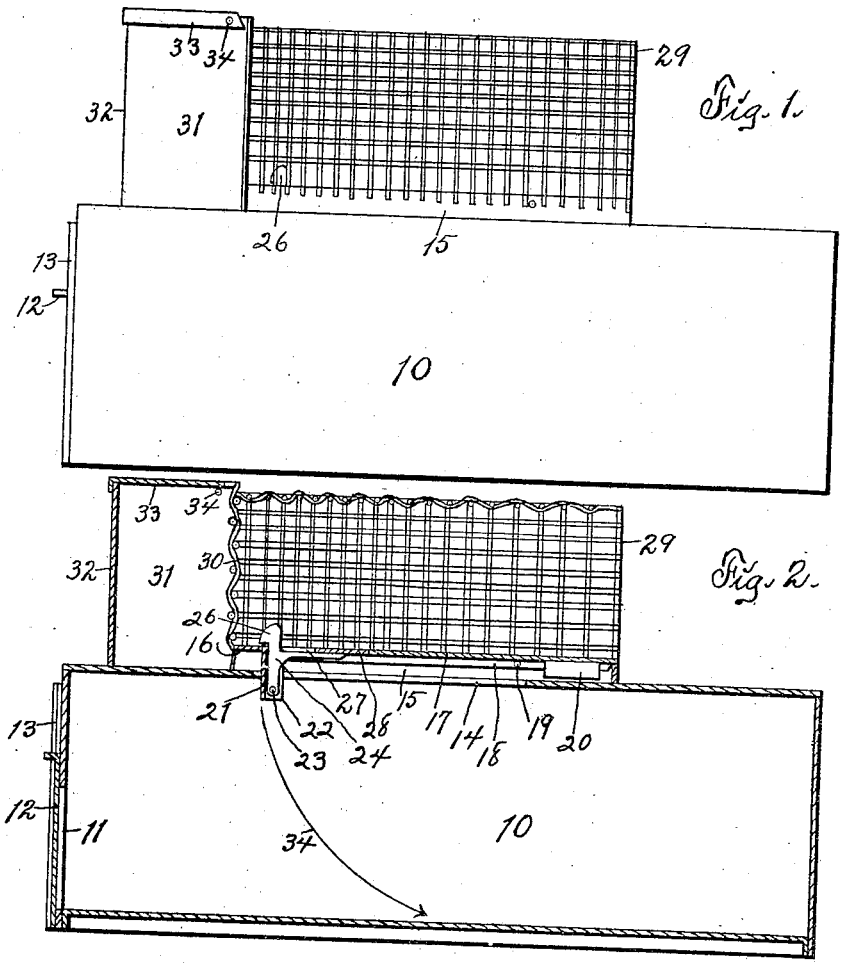
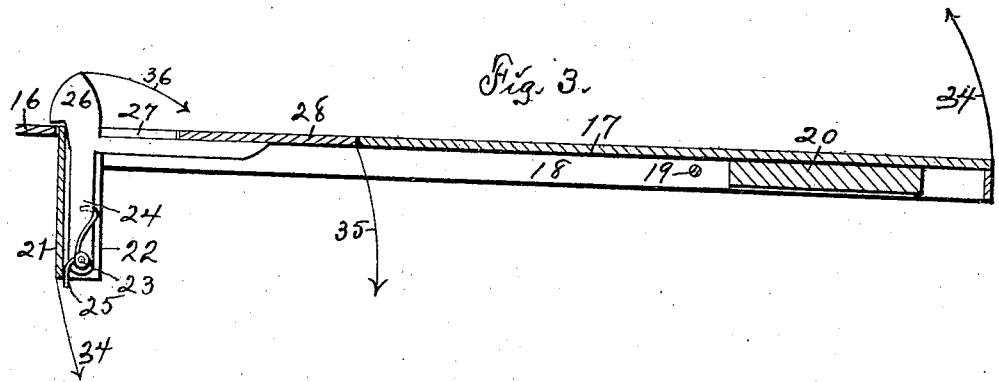

UNITED STATES PATENT OFFICE.

ANDREW ARNESEN, OF DES MOINES, IOWA.

ANIMAL-TRAP.

No. 884,453.     Specification of Letters Patent.     Patented April 14, 1908.

Application filed April 25, 1907. Serial No. 370,693.

*To all whom it may concern:*

Be it known that I, ANDREW ARNESEN, a citizen of the United States of America, and resident of Des Moines, Polk county, Iowa, have invented a new and useful Animal-Trap, of which the following is a specification.

The object of this invention is to provide improved construction for self and ever set animal traps.

A further object of this invention is to provide an improved arrangement between a trap and a cage.

My invention consists in the construction, arrangement and combination of elements hereinafter set forth, pointed out in my claims and illustrated by the accompanying drawing, in which—

Figure 1 is a side elevation of the complete trap. Fig. 2 is a longitudinal vertical section of the trap. Fig. 3 is a detail sectional view of the trap devices.

In the construction of the device as shown the numeral 10 designates a cage, which is preferably made of sheet metal and formed with a doorway 11 in one end adapted to be closed by a door 12 slidingly mounted in bearings 13 fixed to the end of the cage. An opening 14 is formed in the top of the cage 10. A trap section is mounted on the top of the cage 10 and normally covers the opening 14 therein. The trap section is made of walls or flanges 15 fixed to and rising from the top plate of the cage, a cross bar 16 fixed to and connecting the forward ends of the walls above said top plate, and a trap-door 17. The door 17 is formed with down-turned flanges 18 on its side margins entering between the walls of the trap section and a rod 19 is mounted through the flanges and walls and serves as a pivot for said door. The rear end of the door 17 rests on the rear end wall of the trap section. A weight 20 is mounted on the lower face of the door 17 at the rear of the pivot rod 19, and normally holds said door closed and returns it to closed position when it is opened. The forward end portion of the door 17 is turned downward to form a flange 21 and ears 22 are formed on and extend rearward from said flange. A rod 23 is mounted in the ears 22 and a bell-crank 24 is fulcrumed at one end on said rod. A coil spring 25 is mounted on the rod 23 and one end thereof engages the flange 21 while the other end engages the bell-crank. A hook 26 is formed on the bell-crank 24 immediately above the rod 23 and said hook normally engages the rear margin of the cross-bar 16 and latches the door 17 in closed position. The hook 26 extends vertically through a slot 27 in the forward end portion of the door 17. An opening is formed in the door 17 near its forward end and a trigger 28 is loosely mounted in said opening and is fixed to the rear end portion of the bell-crank 24. A housing 29 of woven wire or mesh work, is arched over the trap section and is fixed at its side (bottom) margins to the walls or flanges 15. The housing 29 is open at its rear end and is closed at its forward end by a wall 30 of woven wire or mesh work.

A bait-box is constructed of side-walls 31 and front-wall 32 fixed to the top plate of the cage and to the wall 30 of the housing 29, and a cover 33 hinged to the side-walls by a rod 34. Substance placed in the bait-box to attract animals may be viewed through the wall 30 or screen and attracts an animal into the housing 29 and upon the door 17. The animal passes forward on the door 17 toward and in an effort to obtain the bait and in his travels steps, with one or the other or both forefeet, on the trigger 28 and depresses said trigger slightly. The downward movement of the trigger 28 oscillates the bell-crank 24 and releases the hook 26 from the cross bar 16, thus permitting the door 17 to tilt forward and downward as indicated by the arrow 34 in Fig. 2. The downward movement of the trigger 28 is indicated by the arrow 35 in Fig. 3 and the oscillation of the bell crank is indicated by the arrows 36 in the same view. The forward and downward tilting of the door 17 as described precipitates the animal on said door into the cage 10 and the door returns immediately to normal position through the influence of the weight 20. The bell-crank 24 is oscillated by the trigger 28 in opposition to the spring 25, and immediately on release of said trigger by the animal, said spring repositions the trigger in the opening in the door. The spring 25 yields to permit the hook 26 to pass the rear margin of the cross bar 16 in its upward movement, and then operates to engage said hook above said cross bar.

I claim as my invention—

1. An animal trap, comprising a cage made of sheet metal and formed with an opening in its top, a door in one end of said cage, a trap section mounted on the top of the cage, a cross bar at one end of said trap section, a door pivoted intermediate of its ends in said trap section and formed with a slot, a bell crank on said door, a trigger in said door and fixed to said bell crank, a hook on said bellcrank extending through the slot in said door and normally engaging said cross bar, a screen housing arched over said trap section, a screen wall at the forward end of said housing, and a bait box in front of said housing, said screen wall forming the rear wall of the bait-box.

2. In an animal trap, a trap section formed with a cross bar, a door pivoted intermediate of its ends and having one end adjacent said cross bar and formed with a slot, a flange on and extending downward from the end of said door adjacent said cross bar, a rod on said flange, a lever fulcrumed on said rod, a coil spring on said rod engaging said flange and lever, a trigger in said door and fixed to one end of said lever, and a hook on said lever extending through the slot in said door and adapted to engage said cross bar.

Signed by me at Des Moines, Iowa, this fourth day of April, 1907.

ANDREW ARNESEN.

Witnesses:
S. C. SWEET,
W. E. ELLIS.